US010537842B2

United States Patent
Parikh et al.

(10) Patent No.: US 10,537,842 B2
(45) Date of Patent: Jan. 21, 2020

(54) SYSTEMS AND METHODS FOR UTILIZING A LOW-FRICTION ROTATING COALESCER CONTACT SEAL

(71) Applicant: Cummins Filtration IP, Inc., Columbus, IN (US)

(72) Inventors: Chirag D. Parikh, Madison, WI (US); Christopher E. Holm, Madison, WI (US); Peter K. Herman, Stoughton, WI (US); Brian W. Schwandt, Fort Atkinson, WI (US); Lee A. Peck, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 104 days.

(21) Appl. No.: 15/579,082

(22) PCT Filed: Jun. 8, 2016

(86) PCT No.: PCT/US2016/036384
§ 371 (c)(1),
(2) Date: Dec. 1, 2017

(87) PCT Pub. No.: WO2016/200895
PCT Pub. Date: Dec. 15, 2016

(65) Prior Publication Data
US 2018/0169556 A1 Jun. 21, 2018

Related U.S. Application Data

(60) Provisional application No. 62/173,074, filed on Jun. 9, 2015.

(51) Int. Cl.
*B01D 45/14* (2006.01)
*B01D 46/26* (2006.01)
(Continued)

(52) U.S. Cl.
CPC ......... *B01D 46/0031* (2013.01); *B01D 46/26* (2013.01); *B01D 46/521* (2013.01);
(Continued)

(58) Field of Classification Search
CPC .................. B01D 46/0031; B01D 46/521; B01D 46/003; B01D 45/14; B01D 46/26;
(Continued)

(56) References Cited

U.S. PATENT DOCUMENTS 3,362,155 A    1/1968  Driscoll
3,531,897 A   10/1970  Weimar
(Continued)

FOREIGN PATENT DOCUMENTS

CN    101491793 A    7/2009
CN    104334284 A    2/2015
(Continued)

OTHER PUBLICATIONS

Holdich, R.G., "Fundamentals of Particle Technology," Chapter 8, Midland Information Publishing, Jan. 1, 2002, 15 pages.
(Continued)

*Primary Examiner* — Minh Chau T Pham
(74) *Attorney, Agent, or Firm* — Foley & Lardner LLP (57) ABSTRACT

Rotating coalescer crankcase ventilation (CV) systems are described. The described CV systems utilize a contact seal to seal a gap between a static side of a housing and a rotating coalescer inlet. The rotating coalescer may be driven mechanically, electrically, hydraulically, or the like. The contact seal can be formed via a soft solid or a liquid film created by oil. Accordingly, the contact seal is a hydrodynamic soft seal. The contact seal prevents the blowby gases from bypassing the filter element of the rotating coalescer. At the same time, the contact seal may be broken during
(Continued)

positive blowby gas recirculation circumstances because the contact seal is a hydrodynamic soft seal.

18 Claims, 6 Drawing Sheets

(51) Int. Cl.
*F01M 13/04* (2006.01)
*B01D 46/00* (2006.01)
*B01D 46/52* (2006.01)

(52) U.S. Cl.
CPC ....... *F01M 13/04* (2013.01); *B01D 2271/027* (2013.01); *B01D 2275/10* (2013.01); *B01D 2279/35* (2013.01); *F01M 2013/0422* (2013.01); *F01M 2013/0438* (2013.01)

(58) Field of Classification Search
CPC .......... B01D 2271/027; B01D 2275/10; B01D 2279/35; F01M 13/04; F01M 2013/0422; F01M 2013/0438
USPC ......... 123/198 E, 41.86, 572, 573; 55/385.3, 55/502, DIG. 19
See application file for complete search history.

(56) References Cited

U.S. PATENT DOCUMENTS

| | | | |
|---|---|---|---|
| 4,189,310 A | 2/1980 | Hotta | |
| 4,482,365 A | 11/1984 | Roach | |
| 4,487,618 A | 12/1984 | Mann | |
| 4,514,193 A | 4/1985 | Booth | |
| 4,516,994 A | 5/1985 | Kocher | |
| 4,981,502 A | 1/1991 | Gottschalk | |
| 5,056,935 A * | 10/1991 | Singh | F01D 25/164 384/99 |
| 5,466,385 A | 11/1995 | Rogers et al. | |
| 5,716,423 A | 2/1998 | Krul et al. | |
| 5,863,317 A | 1/1999 | Smith et al. | |
| 6,033,450 A | 3/2000 | Krul et al. | |
| 6,123,061 A | 9/2000 | Baker et al. | |
| 6,139,595 A | 10/2000 | Herman et al. | |
| 6,183,407 B1 | 2/2001 | Hallgren et al. | |
| 6,499,285 B1 | 12/2002 | Snyder | |
| 6,517,612 B1 * | 2/2003 | Crouch | B01D 33/067 95/277 |
| 6,640,792 B2 | 11/2003 | Harvey et al. | |
| 6,652,439 B2 | 11/2003 | Herman et al. | |
| 6,709,477 B1 | 3/2004 | Haakansson et al. | |
| 6,974,567 B2 | 12/2005 | Edwards et al. | |
| 7,235,177 B2 | 6/2007 | Herman et al. | |
| 7,811,347 B2 | 10/2010 | Carlsson et al. | |
| 7,824,458 B2 | 11/2010 | Borgstrom et al. | |
| 7,824,459 B2 | 11/2010 | Borgstrom et al. | |
| 8,172,917 B2 | 5/2012 | Kup et al. | |
| 8,268,033 B2 | 9/2012 | Rogers et al. | |
| 8,794,222 B2 | 8/2014 | Schwandt et al. | |
| 2004/0214710 A1 | 10/2004 | Herman et al. | |
| 2006/0096263 A1 | 5/2006 | Kahlbaugh et al. | |
| 2007/0039300 A1 | 2/2007 | Kahlbaugh et al. | |
| 2007/0175191 A1 | 8/2007 | Ziebold et al. | |
| 2007/0249479 A1 | 10/2007 | Eliasson et al. | |
| 2007/0271884 A1 | 11/2007 | Pearson et al. | |
| 2009/0000258 A1 | 1/2009 | Carlsson et al. | |
| 2009/0044702 A1 | 2/2009 | Adamek et al. | |
| 2009/0056292 A1 | 3/2009 | Fornof et al. | |
| 2009/0067986 A1 | 3/2009 | Mignano | |
| 2009/0101013 A1 | 4/2009 | Moredock | |
| 2009/0263238 A1 | 10/2009 | Jarrah | |
| 2010/0126145 A1 | 5/2010 | He et al. | |
| 2010/0180854 A1* | 7/2010 | Baumann | B04B 5/005 123/196 A |
| 2010/0229511 A1 | 9/2010 | Steins et al. | |
| 2011/0180051 A1 | 7/2011 | Schwandt et al. | |
| 2011/0198280 A1 | 8/2011 | Jones et al. | |
| 2011/0247309 A1 | 10/2011 | Smith et al. | |
| 2011/0252974 A1 | 10/2011 | Verdegan et al. | |
| 2012/0034083 A1 | 2/2012 | Shoji et al. | |
| 2012/0315225 A1 | 12/2012 | Porbeni et al. | |
| 2013/0037481 A1 | 2/2013 | Lalouch et al. | |
| 2013/0167816 A1 | 7/2013 | Dawar et al. | |
| 2014/0069432 A1 | 3/2014 | Mebasser et al. | |
| 2014/0096683 A1 | 4/2014 | Azwell et al. | |
| 2014/0326661 A1 | 11/2014 | Madsen et al. | |
| 2015/0047582 A1 | 2/2015 | Dawar et al. | |
| 2015/0075377 A1 | 3/2015 | Gorbach et al. | |
| 2015/0173577 A1 | 6/2015 | Kim et al. | |
| 2016/0030875 A1 | 2/2016 | Parikh et al. | |
| 2016/0245157 A1 | 8/2016 | Wilkins et al. | |
| 2018/0030868 A1 | 2/2018 | Elsaesser et al. | |
| 2018/0117512 A1 | 5/2018 | Janakiraman et al. | |

FOREIGN PATENT DOCUMENTS

| | | |
|---|---|---|
| DE | 100 44 615 | 4/2002 |
| DE | 203 02 824 U1 | 8/2004 |
| DE | 10 2006 024 816 | 12/2007 |
| EP | 1 532 352 A1 | 5/2005 |
| EP | 1 645 320 A1 | 4/2006 |
| FR | 2933626 A1 | 1/2010 |
| JP | H11-141325 | 5/1999 |
| WO | WO 2011/100712 | 8/2011 |
| WO | WO 2012/106659 | 8/2012 |
| WO | WO 2013/025445 | 2/2013 |
| WO | WO-2016/046944 A1 | 3/2016 |
| WO | WO 2016/159951 | 10/2016 |
| WO | WO-2016/159951 A1 | 10/2016 |
| WO | WO 2017/189516 | 11/2017 |
| WO | WO-2018/002244 A1 | 1/2018 |

OTHER PUBLICATIONS

International Search Report and Written Opinion issued for PCT/US2016/036384, dated Aug. 25, 2016, 9 pages.
International Search Report and Written Opinion issued for PCT/US2016/036432, dated Aug. 31, 2016, 24 pages.
Chinese Office Action from corresponding CN Application No. 2016800326319, dated Mar. 18, 2019, pp. 1-6.
First Office Action for Chinese Patent App. No. 2015800784030 dated Mar. 1, 2019, 19 pages (with translation).
Office Action for U.S. App. No. 15/561,170 dated Mar. 14, 2019, 11 pages.
International Search Report and Written Opinion issued for PCT Application No. PCT/US2016/047755, dated Nov. 4, 2016, 10 pages.
International Search Report and Written Opinion issued for PCT/U2017/029315, issued Aug. 1, 2017, 14 pages.
International Search Report and Written Opinion issued for PCT/US2015/023290, dated Jun. 29, 2015, 10 pages.
International Search Report and Written Opinion issued for PCT/US2016/048912, dated Nov. 10, 2016, 12 pages.
Extended European Search Report for European Patent App. No. 17790235.0 dated Oct. 25, 2019, 9 pages.
Office Action issued for U.S. Appl. No. 16/096585, dated Oct. 16, 2019, 10 pages.

* cited by examiner

SYSTEMS AND METHODS FOR UTILIZING A LOW-FRICTION ROTATING COALESCER CONTACT SEAL

CROSS-REFERENCE TO RELATED APPLICATIONS

This application is a National Phase of PCT Application No. PCT/US2016/036384, filed Jun. 8, 2016, which claims the benefit of priority to U.S. Provisional Patent Application No. 62/173,074 filed Jun. 9, 2015. The contents of both applications are incorporated herein by reference in their entirety.

TECHNICAL FIELD

The present application relates to crankcase ventilation (CV) systems that utilize rotating coalescing devices.

BACKGROUND

During operation of an internal combustion engine, a fraction of combustion gases can flow out of the combustion cylinder and into the crankcase of the engine. These gases are often called "blowby" gases. Typically, the blowby gases are routed out of the crankcase via a CV system. The CV system passes the blowby gases through a coalescer (i.e., a coalescing filter element) to remove a majority of the aerosols and oils contained in the blowby gases. The filtered blowby gases are then either vented to the ambient (in open CV systems) or routed back to the air intake for the internal combustion engine for further combustion (in closed CV systems).

Many CV systems utilize rotating coalescers. Rotating coalescers may include fibrous filters as well as centrifugal separation devices. Performance attributes of rotating coalescer devices may be measured in terms of pressure drop (or rise) through the device and efficiency of oil removal. In rotating coalescers, the oil droplets (e.g., aerosol) suspended and transported by the blowby gases are separated inside the coalescer media through the particle capture mechanisms of inertial impaction, interception, and diffusion onto the fibers. By rotating the media, inertial impaction is enhanced by the additional centrifugal force. In addition to this aspect, after the oil droplets coalesce to form larger drops, the centrifugal force removes the larger drops by overcoming the surface drag force of the media fibers. This aspect increases the collection of and the discharge of the oil from the coalescer by providing improved drainage compared to a stationary coalescer. In turn, the improved drainage from the rotating coalescing filter aids in improving the filtration efficiency as well as greatly reducing the pressure drop across the filter.

Since the rotating coalescer is positioned within a static filter housing, there is typically a slight gap between the rotating components and the stationary housing. For example, a gap may exist between the static inlet of the housing and the rotating inlet opening of the rotating coalescer. This gap can allow unfiltered aerosol contained in the blowby gases to bypass the rotating coalescer if the downstream pressure on the clean side of the rotating media in the radial vicinity of the gap is lower than the upstream pressure on the dirty side of the rotating media in the radial vicinity of the gap. Exemplary gaps are shown, for example, in U.S. Pat. No. 4,189,310, entitled "APPARATUS FOR REMOVING OIL MIST," by Hotta (see, e.g., the gaps in FIG. 4). The bypass of unfiltered blowby gases can be detrimental to the efficiency of the CV system, particularly at larger aerosol sizes for which the filtering medium is highly efficient at removing. One solution is the use of a high rotational speed rotating coalescer that creates the necessary pumping pressure to cause positive recirculation through the gap (i.e., the recirculation of already filtered blowby gases from the clean side of the filter media to the dirty side of the filter media through the gap). However, the increased mechanical loads caused by the high rotational speed rotating coalescers may reduce reliability and/or increase costs. Additionally, certain internal combustion engines may not be equipped with the components necessary to rotate the rotating coalescer at the required high speed while maintaining a reasonable media permeability and thickness.

SUMMARY

One exemplary embodiment relates to a CV system. The CV system includes a housing having an inlet and an outlet. The inlet is configured to receive blowby gases from an internal combustion engine and to provide the blowby gases to the housing. The outlet is configured to provide filtered blowby gases from the housing and to at least one of an intake of the internal combustion engine and the ambient. The CV system includes a rotating coalescer positioned within the housing. The rotating coalescer includes an endcap and a filter media. The CV system further includes an oil inlet. The oil inlet provides oil to a gap between a stationary portion of the housing and the endcap such that a hydrodynamic seal is formed by the oil positioned in the gap during an operating condition of the rotating coalescer, the hydrodynamic seal preventing a negative recirculation of the blowby gases.

Another exemplary embodiment relates to a CV system. The CV system includes a housing having an inlet and an outlet. The inlet is configured to receive blowby gases from an internal combustion engine and to provide the blowby gases to the housing. The outlet is configured to provide filtered blowby gases from the housing and to at least one of an intake of the internal combustion engine and an ambient. The CV system further includes a rotating coalescer positioned within the housing such that a gap exists between a portion of the rotating coalescer and a stationary portion of the housing. The CV system includes an elastomeric gasket that provides a seal between the rotating coalescer and the stationary portion of the housing. The rotating coalescer may include an endcap and a filter media.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, rotating coalescer CV systems are described. The described CV systems utilize a contact seal to seal a gap between a static side of a housing and a rotating coalescer inlet. The rotating coalescer may be driven mechanically, electrically, hydraulically, or the like. The contact seal can be formed via a soft solid or a liquid film created by oil. Accordingly, the contact seal is a hydrodynamic or soft seal. The contact seal prevents the blowby gases from bypassing the filter element of the rotating coalescer. The hydrodynamic or soft seal may function as a low-friction bearing for the rotating coalescer. The hydrodynamic or soft seal is effective in rotating coalescer applications where positive recirculation through the gap where the seal forms cannot be guaranteed otherwise. Such situations may occur, for example, where input (i.e., rotational) power for the rotating coalescer is restricted to low amounts. At the same time, the contact seal may be broken during positive blowby gas recirculation circumstances (e.g., as caused by a pumping force created by a rotating coalescer and/or internal radial vanes) because the contact seal is a hydrodynamic soft seal. In some situations, the contact seal may be broken by centrifugal force acting upon the seal itself, such that the drag torque is eliminated when speeds are high enough to sustain positive recirculation.

Figure 1:
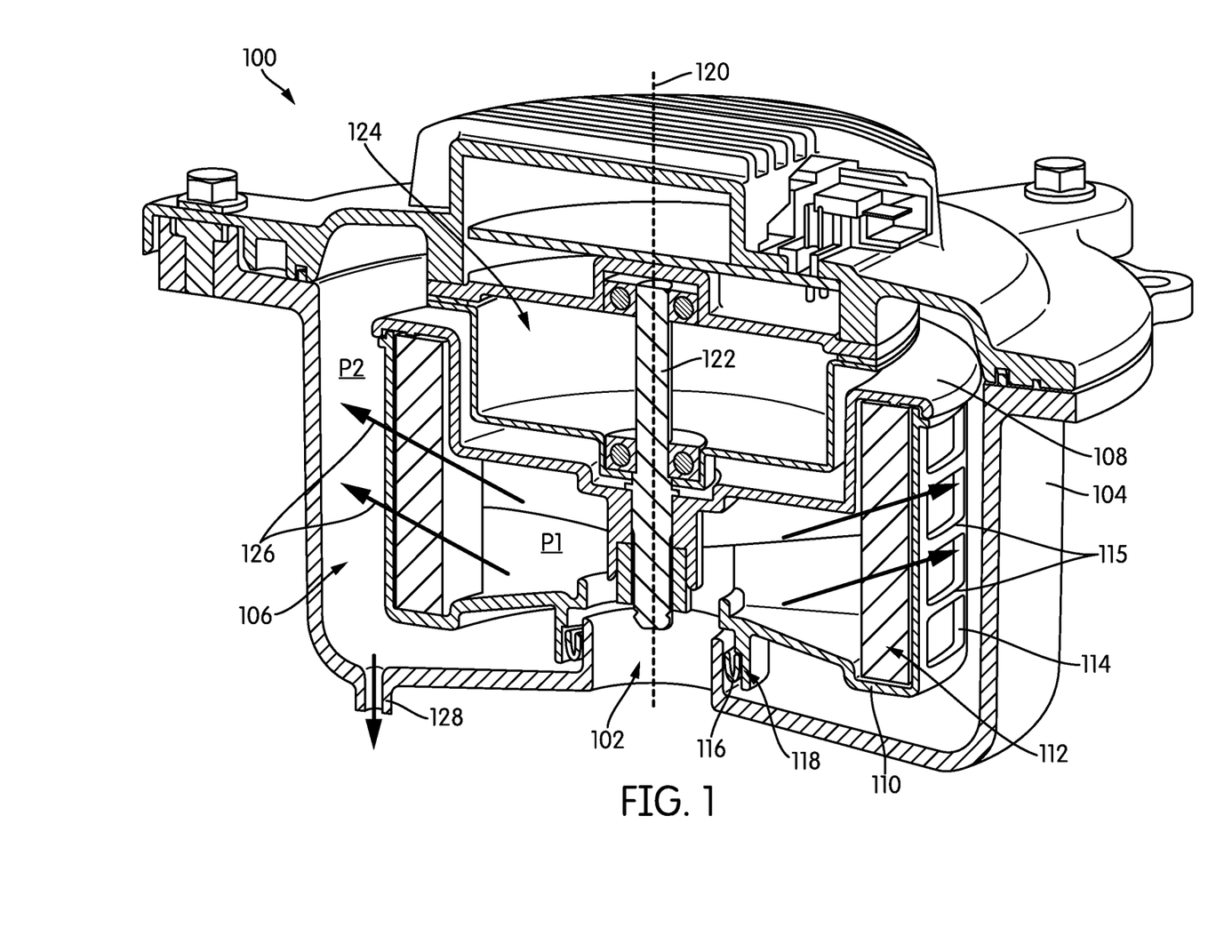
FIG. 1 is a cross-sectional view of a CV system 100 according to an exemplary embodiment.

Referring to FIG. 1, a cross-sectional view of a CV system 100 is shown according to an exemplary embodiment. The CV system 100 includes a blowby gas inlet 102 that receives blowby gas from a crankcase of an internal combustion engine to a housing 104 of the CV system 100. The inlet 102 is coupled to the housing 104. The housing 104 is a stationary or static housing. The CV system 100 includes a blowby gas outlet (not shown) that outputs filtered blowby gas during operation of the CV system 100. The outlet is coupled to the housing 104. The outlet may be coupled to an air intake of the internal combustion engine (e.g., in a closed CV system arrangement) or may vent to the ambient (e.g., in an open CV system arrangement). The CV system 100 includes a rotating coalescer 106 positioned within the housing. The rotating coalescer 106 includes a first endcap 108 and a second endcap 110. It should be understood, however, that the rotating coalescer 106 could also comprise a single endcap in certain alternative embodiments. A filter media 112 is positioned between the first and second endcaps 108 and 110. In some arrangements, a frame 114 surrounds an outside surface of the filter media 112 to provided structural support to the filter media 112 when the rotating coalescer 106 is rotating. The frame 114 includes a plurality of radial vanes 115. The radial vanes 115 act as centrifugal fan blades so as to contribute to a pumping pressure created by the rotating coalescer 106. The creation of the pumping pressure by the rotating coalescer 106 is described in further detail below. In some arrangements, the CV system 100 includes a flexible seal 116 positioned between a rotating inlet portion of the second endcap 110 and the inlet 102 of the static housing 104. The flexible seal 116 has a V-shape or a U-shape. The flexible seal 116 is an elastomeric seal. In some arrangements, the flexible seal 116 is stiffened by molding the flexible seal 116 over a metallic carrier ring. In further arrangements, the flexible seal 116 is stiffened by the inclusion of a spiral garter spring, which assists in increasing and/or maintaining the sealing force of the flexible seal 116 over long timer periods and/or high temperatures. The flexible seal 116 forms a bushing between the rotating inlet portion of the second endcap 110 and the inlet 102 of the static housing 104. The flexible seal 116 may form a contact seal between the rotating inlet portion of the second endcap 110 and the inlet 102 of the static housing 104. The flexible seal 116 may be pressed into or affixed to the rotating second endcap 110 or pressed onto the stationary portion of the static housing 104 (e.g., the stationary shaft). In arrangements where the flexible seal 116 is pressed into or affixed to the rotating second endcap 110, centrifugal forces on the flexible seal 116 assist in reducing the drag torque caused by the flexible seal 116.

Figure 2:
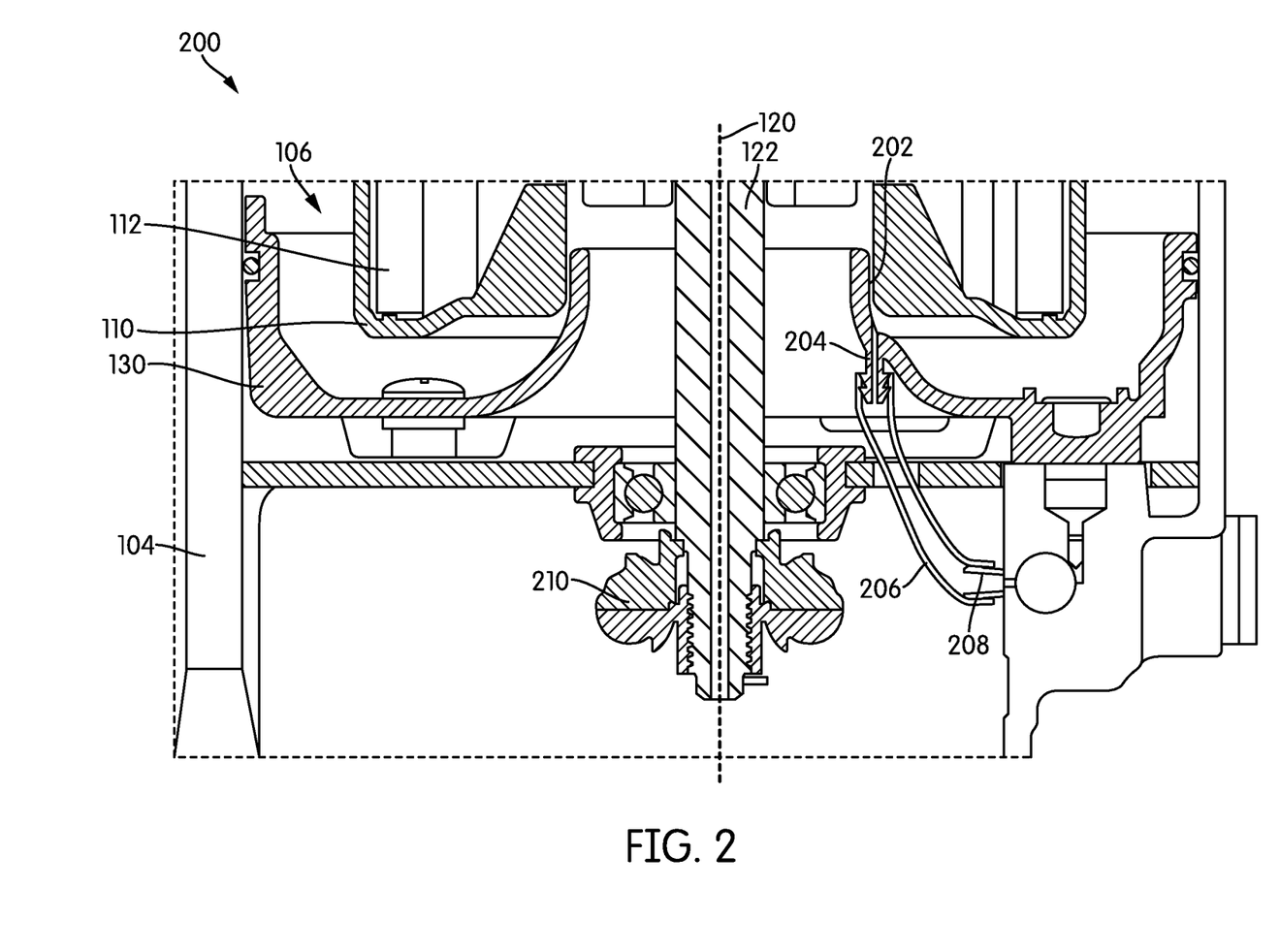
FIGS. 2 and 3 are close-up cross-sectional views of portions of a CV system having a hydrodynamic soft seal.

During operation, the rotating coalescer 106 is rotated along its central axis 120 by a central shaft 122 coupled to the rotating coalescer 106. The first and second endcaps 108 and 110 are secured to the central shaft 122 such that when the central shaft 122 rotates, the filter media 112 rotates. As shown in FIG. 1, the central shaft 122 is rotated by an electric motor 124. In alternative arrangements, the central shaft 122 is rotated by a fluid driven pelton wheel (e.g., as shown in FIG. 2), a chain drive system, or a belt drive system. As the rotating coalescer 106 rotates, blowby gas flows into along flow path 126. The flow path 126 directs the blowby gas into the inlet 102, through the filter media 112 (as shown by arrows 126), and out of the housing 104 via the outlet. As the blowby gases pass through the filter media 112, oil suspended in the blowby gas, such as aerosols, are separated. The separated oil is collected at the bottom of the housing 104 and is drained back to the crankcase via a drain 128. In some arrangements, the separated oil is collected in a drain pan 130 positioned in a bottom portion of the housing 104. The drain pan 130 may be a stationary part coupled to the housing 104 or integral with the housing 104. In such arrangements, the flexible seal 116 may be positioned between the stationary drain pan 130 and the rotating inlet portion of the second endcap 110.

Still referring to FIG. 1, during operation, the flexible seal 116 rotates with the second endplate 110. As the flexible seal 116 rotates, the seal created between the flexible seal 116 and the inlet 102 may be broken under certain circumstances. For example, if the pressure on the dirty side of the filter media 112 (P1) is larger than the pressure on the clean side of the filter element (P2), blowby gases may force the seal to break, and the blowby gases can bypass the filter media 112, which creates negative recirculation of the blowby gas. The negative recirculation reduces the overall filtration efficiency of the CV system 100. Further, the centrifugal forces acting on the flexible seal 116 assist in causing the flexible seal 116 to flex outward (i.e., collapse) and lose contact with the static housing 104 when speeds are adequately high enough to achieve positive recirculation pumping of the filtered blowby gases. As another example, if the pressure on the dirty side of the filter media 112 (P1) is smaller than the pressure on the clean side of the filter media 112 (P2), blowby gases may force the seal to break and the blowby gases can positively recirculate from the clean side of the filter media 112. In this example, the downstream side of the rotating coalescer 106 does not get contaminated with dirty blowby gas because the higher P2 than P1 eliminates the negative recirculation. Higher rotational speed of the rotating coalescer 106 is required to maintain P2 greater than P1 (positive recirculation). The ratio of the contact pressure of the flexible seal 116 and the pressure differential (P2–P1) across the gap is preferable greater than or equal to one. Accordingly, when the pumping ratio (i.e., P2/P1) is less than 1, the contact pressure of the flexible seal 116 is greater than 1.

In an alternative arrangement, a lip seal can be used instead of the V-shaped or U-shaped shaped flexible seal 116. In such arrangements, the rotational speed of the rotating coalescer 106 may be reduced compared to arrangements utilizing the flexible seal 116 because the lip seal can seal a higher pressure differential between P1 and P2 with less contact pressure than the flexible seal 116. The higher pressure differential enables the use of thicker, less porous, and more efficient filter media than in arrangements that utilize the flexible seal 116.

Figure 3:
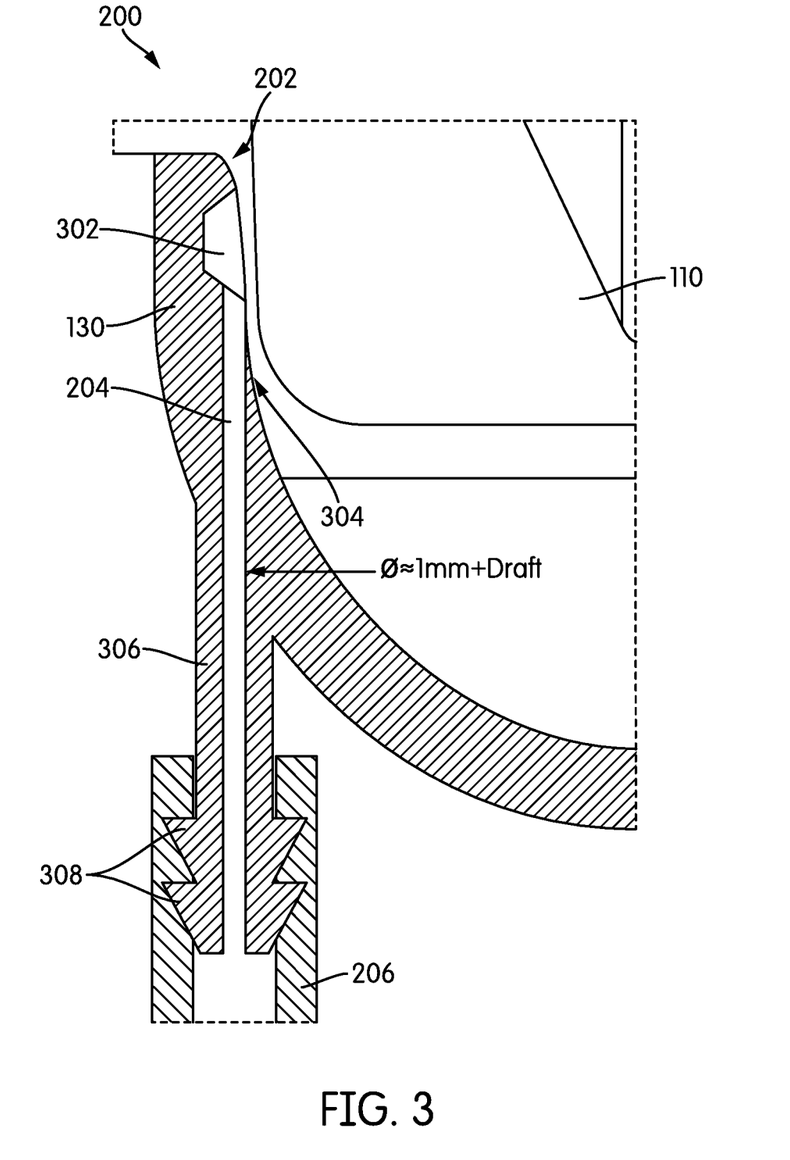

As described in further detail below with respect to FIGS. 2 and 3, a CV system 200 can utilize a hydrodynamic soft seal in addition to or in place of the flexible seal 116 of the CV system 100. The described hydrodynamic soft seal of the CV system 200 prevents the blowby gases from bypassing the filter media 112 in a negative recirculation condition. Additionally, the hydrodynamic soft seal is formed of oil and provides additional lubrication for the rotating parts at the contact area of the hydrodynamic soft seal. Thus, the hydrodynamic soft seal allows for a non-contact and wear-free seal between the rotating coalescer and the static housing 104.

Referring to FIG. 2, a close-up cross-sectional view of a bottom portion of a CV system 200 is shown according to an exemplary embodiment. The CV system 200 is similar to the CV system 100 of FIG. 1. The primary difference between the CV system 200 and the CV system 100 is that the CV system 200 does not include a flexible seal (e.g., flexible seal 116 of CV system 100). Instead, the CV system 200 utilizes a hydrodynamic soft seal. Accordingly, like numbering is used in describing the overlapping parts of CV system 200 and CV system 100. The hydrodynamic seal is described in further detail below.

As shown in FIG. 2, a gap 202 exists between the stationary drain pan 130 of the housing and the second endcap 110 of the rotating coalescer 106. An additional close-up cross-sectional view of the area of the CV system 200 near the gap 202 is shown in FIG. 3. In some arrangements, the gap 202 is approximately one millimeter. If not sealed, blowby gas passing through the CV system 200 may bypass the filter media 112 of the rotating coalescer 106 by flowing through the gap 202 during operation of the CV system 200. To prevent this, a hydrodynamic seal is formed that plugs the gap 202 during negative recirculation operational conditions.

The hydrodynamic seal is formed from oil. Accordingly, the drain pain 130 includes an oil inlet 204. The oil inlet is coupled to a supply line 206, which is coupled to a pressurized oil supply 208. In some arrangements, the supply line 206 is a flexible tube fed through an opening in the bottom of the housing 104. The pressurized oil supply 208 provides pressurized oil to the oil inlet 204 via the supply line 206. In some arrangements, the pressurized oil supply 208 also drives the rotation of the rotating coalescer 106 (e.g., by spinning a pelton wheel 210). The oil may be lube oil from a lubrication system of the internal combustion engine. The oil inlet 204 supplies oil to the gap 202. The oil supplied by the oil inlet 204 is spread in a substantially uniform manner throughout the gap when the rotating coalescer 106 rotates. The circumferential spreading of the oil may be further improved with the inclusion of a circumferential groove (e.g., circumferential groove 302 as shown in FIG. 3). The oil within the gap 202 forms a hydrodynamic film of liquid oil that creates a soft, hydrodynamic seal between the drain pan 130 and the rotating inlet portion of the second endcap 110. The oil within the gap 202 essentially forms a bushing between the rotating inlet portion of the rotating coalescer 106 and the inlet 102 of the static housing 104. Excess oil is gathered in the drain pan 130 and returned to the crankcase in the same manner as separated oil from the blowby gases processed by the CV system 200.

In some arrangements, a circumferential groove 302 in the vertical component of the drain pan 130 helps to facilitate the formation of the hydrodynamic seal. The circumferential groove 302 completely circumscribes the vertical component of the drain pan 130. In arrangements where the circumferential groove 302 is formed in a plastic drain pan 130, special design considerations are needed. In some arrangements, the opening of the inlet 204 is positioned above a bottom portion 304 of the gap 202, which allows for a short core pin to be used in creating the inlet 204 during injection molding of the drain pan 130. Additionally, a length of the molding pin 306 should remain short to prevent warping of the pin 306 and the oil inlet 204 during the high injection pressures. The pin 306 includes barbs 308 that secure the supply line 206 to the pin 306 and the oil inlet 204.

The hydrodynamic seal formed by the oil within the gap 202 has different characteristics depending at least in part on the temperature of the oil. The warmer the oil, the less viscous the oil becomes. In arrangements where the oil is cold and more viscous (e.g., when the internal combustion engine is cold), the oil causes a higher drag on the rotating coalescer 106 than if less viscous (i.e., warmer) oil fills the gap 202. The higher drag causes the rotating coalescer 106 to rotate at a slower speed than if the warmer, less viscous oil were used. Since the rotating coalescer 106 is rotating at a lower speed, the pumping pressure is reduced, which potentially creates a blowby bypass situation with negative recirculation through the gap 202. However, the more viscous oil forms a stronger hydrodynamic seal than warmer, less viscous oil. Thus, even though there is a lower pumping pressure, which results in a lower P2, the stronger hydrodynamic seal effectively plugs the gap 202 and prevents blowby gases from bypassing the filter media 112. In arrangements where the oil is warm and less viscous than the cold oil, the oil causes a lower drag on the rotating coalescer 106, and the rotating coalescer 106 can rotate at a higher speed. Since the rotating coalescer 106 is rotating at a higher speed, the pumping pressure is increased, which reduces the likelihood of blowby bypass through the gap 202 because of a positive recirculation effect. Accordingly, even though the warmer oil forms a weaker hydrodynamic seal, blowby gas does not bypass the filter media 112 by flowing through the gap 202. In some arrangements while using the warmer oil, the spinning of the rotating coalescer 106 breaks the hydrodynamic seal, which is not required because of positive recirculation caused by the pumping effect created by the rotating coalescer 106. As discussed above, the hydrodynamic seal is formed by oil flowing through the circumferential groove 302 and sealing against the second endcap 110. In other arrangements, the hydrodynamic seal can be formed by a labrynith-shaped groove (i.e., a groove that also includes axial components) or an axial tongue and groove (e.g., as discussed below with respect to FIG. 4).

Figure 4:
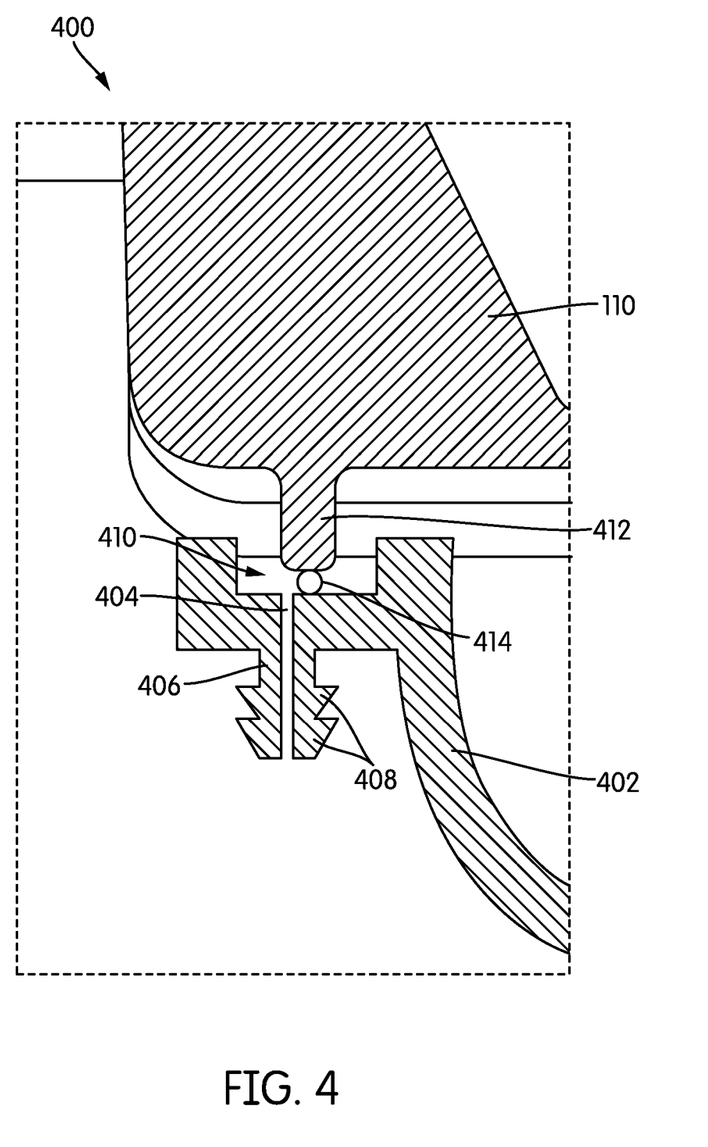
FIG. 4 is a close-up cross-sectional view of portions of a CV system according to another exemplary embodiment.

Referring to FIG. 4, a close-up cross-sectional view of a CV system 400 having a hydrodynamic seal is shown according to an exemplary arrangement. The CV system 400 is similar to the CV system 200 of FIGS. 2 and 3. The CV system 400 differs from the CV system 200 in the way the hydrodynamic seal is formed. Accordingly, like numbering is used in describing the overlapping parts of CV system 400 and CV system 200. The CV system 400 includes a drain pan 402. The drain pan 402 includes an oil inlet 404 and a pin 406 having barbs 408. The oil inlet 404 and the pin 406 are coupled to a pressurized oil supply (e.g., in the same manner as described above with respect to the CV system 200). The oil inlet 404 provides oil to a groove 410 formed in the extension portion 402. The second endplate 110 of the rotating coalescer 106 includes a tongue 412. The tongue 412 partially extends into the groove 410. A gap 414 exists between and is defined by the tongue 412 and the groove 410. The oil provided into the groove 410 via the oil inlet 404 forms a hydrodynamic seal between the groove 410 and the tongue 412 effectively sealing the gap 414 in the same manner as described above with respect to the CV system 200. The tongue and groove design of the CV system 400 provides the additional benefit of providing axial vibration damping of the rotating coalescer with respect to the housing. However, the hydrodynamic seal formed by the tongue and groove system may cause higher drag torque on the rotating coalescer than experienced in the CV system 200. Additionally, the CV system 400 requires less oil to form the hydrodynamic seal because the oil is retained in the groove 410 instead of flowing down the side of the drain pan 402 as in the CV system 200.

In the above-described CV systems (CV system 100, CV system 200, and CV system 400), the seal can be positioned on the inner diameter of the stationary part (e.g., the drain pan 130), the outer diameter of the stationary part, the inner diameter of the rotating part (e.g., the second endplate 110), or the outer diameter of the rotating part. The hydrodynamic seal generally reduces power consumption required to spin the rotating coalescer compared to a conventional rotary shaft seal (e.g., flexible seal 116) and provides for CV systems that have a higher overall efficiency despite the lower power consumption.

Figure 5:
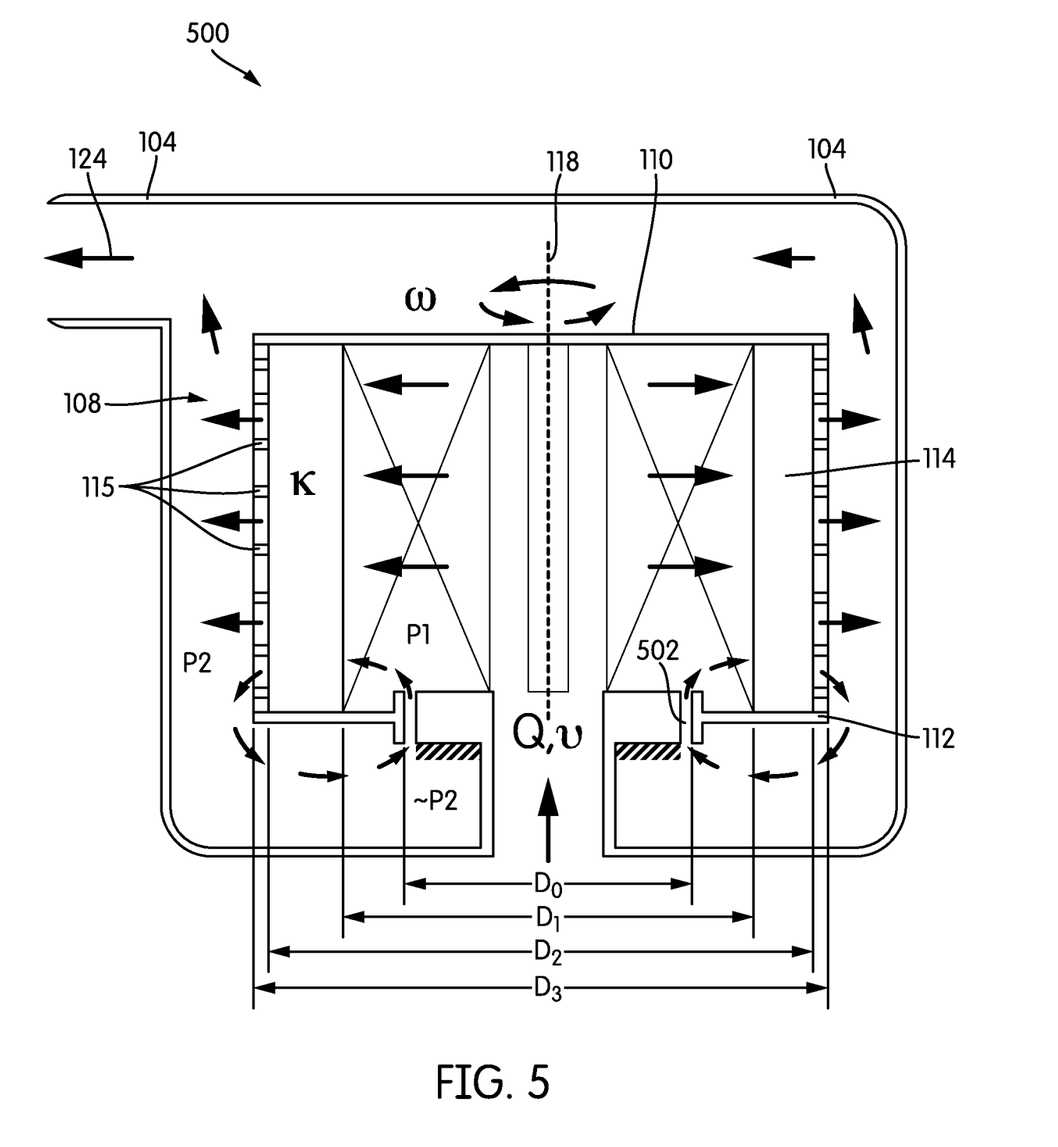
FIG. 5 is a simplified cross-sectional view of the CV systems of FIGS. 1 through 4.

Referring to FIG. 5, a schematic view of a CV system 500 is shown. The CV system 500 is representative of CV systems 100, 200, and 400. The CV system 500 uses like numbering to describe the like components as shown in CV systems 100, 200, and 400. The CV system includes a gap 502. The gap 502 is representative of the gap 202, the gap 414, and the gap plugged by the flexible seal 116. As discussed above with respect to CV systems 100, 200, and 400, the flow of blowby gas pass through either the filter media 112 or through the gap 502. The flow split between the flow though the gap 502 and the filter media 112 depends on pressure drop across gap, the filter media 112, and any seal positioned within the gap (e.g., the above-discussed hydrodynamic seal, flexible seal 116, etc.).

When the rotating coalescer 106 is rotating, the filter media 112 creates centrifugal "pumping" pressure due to its rotational velocity "w", which can create higher pressure P2 at the outer (downstream or clean) side of the filter media 112 than P1 at the inner (upstream or dirty) side of the filter media 112 under certain circumstances. This pressure situation exists when certain design criteria of the CV system 500 are met. The design criteria relates to the magnitude of rotational velocity "ω", flowrate "Q", dimensions $D_0$, $D_1$, $D_2$, $D_3$, and the average intrinsic permeability of filter media 112 "κ" in the approximately direction of gas flow through the filter media 112. As illustrated in FIG. 3, if pressure P2>P1, then "positive" recirculation exists, whereby a portion of filtered gas from the clean side of the filter media 112 returns through the rotating gap 502 to the upstream, dirty side of the filter media 112, thus recirculating and causing no loss in filtration efficiency. In some arrangements, the radial vanes 115 also contribute to the pumping pressure. Alternatively, it can be said that if pressure P2<P1, then "negative" recirculation exists whereby a meaningful percentage of the aerosol-laden blowby gas can pass to the clean side of the filter media 112 through the gap 502 thereby bypassing the filter media 112, causing a reduction in filtration efficiency. During the negative recirculation situations, the above-described hydrodynamic or soft seal and flexible seal 116 prevent the negative circulation. However, during a strong enough positive recirculation condition, the hydrodynamic or soft seal can be broken to permit the positive recirculation of blowby gas through the rotating coalescer 106.

Referring to the negative recirculation situations, in which the various contact seals prevent negative recirculation over a sufficiently wide range of P1 to P2 differential pressure, it is desirable to utilize filter media having high efficiency characteristics. For example, media with greater number of hydraulic radii, as defined by the dimensionless parameter of $$N_{hyd} = \frac{t}{\sqrt{\kappa}},$$

can be expected to be higher in aerosol capture efficiency since physical characteristics of the media that lead to greater hydraulic radii count, such as smaller fiber diameter, lower porosity, or greater thickness also tend to result in greater fine aerosol capture efficiency in rotating porous coalescers. Therefore, the conditions which are consistent with high efficiency operation at lowest possible pressure drop or within allowable pressure drop can be defined. For example, this is described when equation 1 is satisfied (equation 1 relates to annular non-pleated media), and the resulting value for pressure, P1, does not exceed an allowable value established by the engine manufacturer implanting the system.

$$\frac{\pi \cdot \kappa \cdot \omega^2 \cdot h \cdot (D_3^2 - D_0^2)}{4 \cdot Q \cdot v \cdot \ln\left(\frac{D_2}{D_1}\right)} < 1 \qquad (1)$$

For various engine applications, this pressure value varies, but is often between approximately −1 kPa and 7 kPa for commercial diesel engines. For annular pleated elements, the following equation applies similarly:

$$\frac{\kappa \cdot N \cdot h \cdot \left(D_2^2 - 2D_1 D_2 \cos\left(\frac{\pi}{N}\right) + D_1^2\right)^{\frac{1}{2}} \cdot \omega^2 \cdot (D_3^2 - D_0^2)}{8 \cdot Q \cdot v \cdot t} < 1 \qquad (2)$$

Equation 2 should be satisfied, and the resulting value for pressure, P1, does not exceed an allowable value established by the engine manufacturer implanting the system.

The rotating coalescer 106 can have filter media arrangements that include a single layer or multiplayer construction, in which different physical properties (e.g., fiber diameter, porosity, etc.) are combined in a series. For arrangements that utilize a single layer of media, the intrinsic permeability of the filter media 112 is defined below in equation 3.

$$\kappa = \frac{v \cdot \mu \cdot t}{\Delta P} \qquad (3)$$

In equation 3, κ has dimensional units of length squared, V is the superficial fluid velocity through the media 112, μ is the fluid viscosity, t is the media thickness, and ΔP is the pressure drop across the media 112 from an upstream position to a downstream position.

For single and multilayer media constructions, the average intrinsic permeability through the media 112 is defined by equation 4.

$$\frac{\sum_{i}^{n} t_i}{\sum_{i}^{n}\left(\frac{t_i}{\kappa_i}\right)} \quad (4)$$

In equation 4, n is the number of layers of media, $t_i$ is the thickness of layer "i", and $\kappa_i$ is the intrinsic permeability of layer "i".

A simple numeric example of the average intrinsic permeability calculation for a three layer multilayer media construction is shown below in Table 1.

TABLE 1

| Layer "n" | Layer Thickness | Layer Intrinsic Perm. | Thickness/ Permeability |
|---|---|---|---|
| layer1 | 0.2 | 5 | 0.04 |
| layer2 | 1 | 10 | 0.1 |
| layer3 | 5 | 20 | 0.25 |
| Total Thickness: | 6.2 | Total Thickness/ Permeability: | 0.39 |

Average composite intrinsic permeability: 15.9

Experimentally, the average intrinsic permeability can simply be measured by maintaining air flow through a flat sample of the multilayer porous media under controlled conditions of gas viscosity (μ) and superficial velocity (v) while measuring the pressure drop from the upstream side of the media to the downstream side of the media. The average intrinsic permeability is calculated using equation 1 above.

As noted above, positive recirculation of the blowby gas through the gaps of the above-described CV systems is achieved when P2>P1 (alternatively stated as P2/P1>1). When P2>P1, the seal is non-contacting. This situation can be achieved by intentionally selecting an optimum combination of the following critical parameters for the rotating coalescer 106 and the CV system 100. Table 2 describes the various design parameters that are utilized in calculating the optimal CV system design to achieve the positive recirculation.

TABLE 2

| Symbol | Description | Units |
|---|---|---|
| ρ | gas density | kg/m³ |
| ω | rotational speed | rad/s |
| h | media height | m |
| $D_0$ | inside diameter of rotating annul portion of element | m |
| $D_1$ | media inner diameter | m |
| $D_2$ | media/rotor outer diameter | m |
| $D_3$ | element outer diameter | m |
| μ | gas viscosity | kg/m · s |
| υ | gas kinematic viscosity | m²/s |
| Q | gas flowrate | m³/s |
| κ | average intrinsic permeability of media | m² |

As described in further detail below, different design parameter optimizations are utilized depending on whether the filter media 112 is comprised of a pleated porous media or a non-pleated porous media.

In arrangements where the filter media 112 is an annular porous non-pleated media, if the condition of equation 5 is met, P2>P1 is maintained and the seal is non-contacting, which results in positive gas recirculation through the gap.

$$\frac{\pi \cdot \kappa \cdot \omega^2 \cdot h \cdot (D_3^2 - D_0^2)}{4 \cdot Q \cdot v \cdot \ln\left(\frac{D_2}{D_1}\right)} > 1 \quad (5)$$

Figure 6:
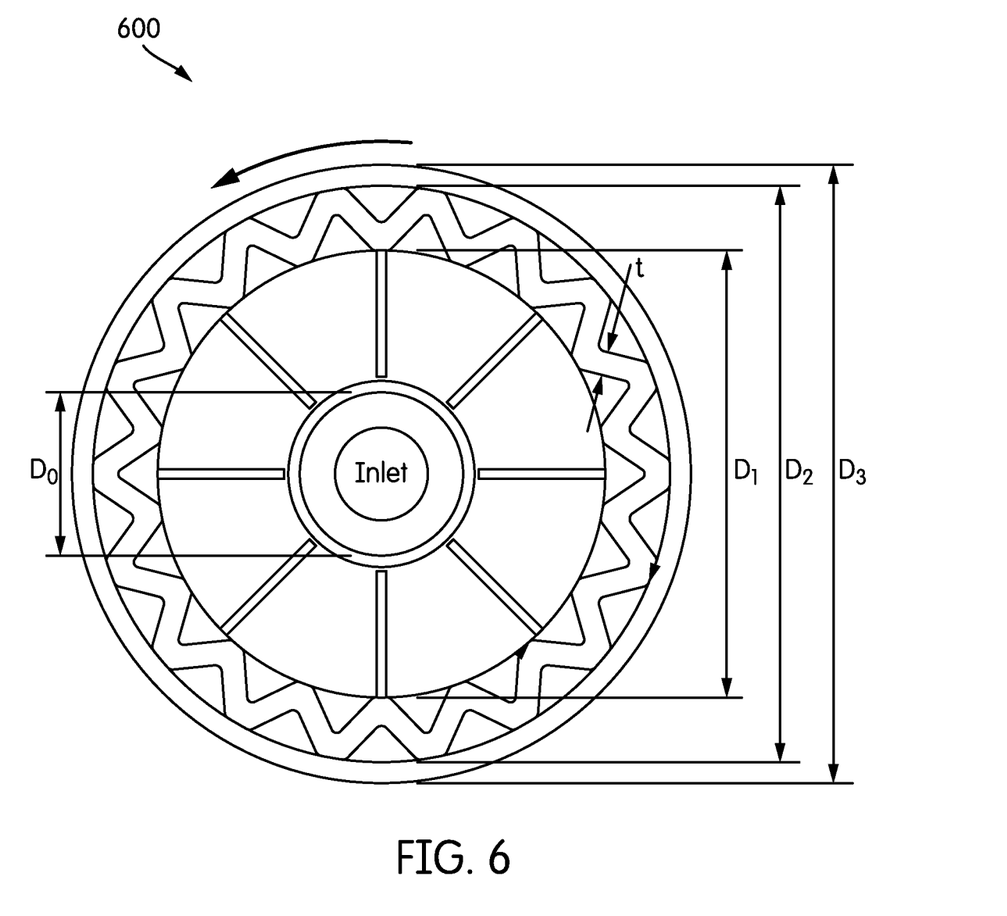
FIG. 6 is a cross-sectional view of a pleated annular filter element is shown according to an exemplary embodiment.

In other arrangements, the filter media 112 is an annular porous pleated media. For example, a cross-sectional view of a pleated annular filter element 600 is shown according to an exemplary embodiment. As shown in FIG. 6, the pleats of the pleated annular filter element 600 are arranged within the annular zone defined by the outer diameter $D_2$ and the inner diameter $D_1$. The additional terms required for determining the optimized size and arrangement of the pleated annular filter element 600 are the number of pleats (N) and the thickness of the media normal to the flow direction through the media (t, measure in m). The number of pleats must be greater than 2, and typically is greater than 10. Accordingly, for arrangements utilizing the pleated annular filter element 600, positive gas recirculation occurs when the condition of equation 6 is satisfied and the seal is non-contacting.

$$\frac{\kappa \cdot N \cdot h \cdot \left(D_2^2 - 2D_1 D_2 \cos\left(\frac{\pi}{N}\right) + D_1^2\right)^{\frac{1}{2}} \cdot \omega^2 \cdot (D_3^2 - D_0^2)}{8 \cdot Q \cdot v \cdot t} > 1 \quad (6)$$

As shown in equations 5 and 6, different CV system designs having a widely different sizes, operating speeds, and/or flow rates may require filtering media with significantly different intrinsic characteristics. For example, diesel engine CV applications for on-highway and off-highway equipment are typically constrained by practical considerations such as space available in the vicinity of the engine, energy available for inducing rotation of the rotating coalescer, and the strength of economically available materials of construction. Accordingly, it is preferable to design rotating porous or fibrous medium coalescers that may be utilized across multiple different applications and that share a range of common filtering medium properties across a very broad range of engine sizes and rotating coalescer operating speeds and sizes.

A narrower range of values for preferred arrangements of rotating porous medium coalescers can be defined utilizing a dimensionless parameter of $$N_{hyd} = \frac{t}{\sqrt{\kappa}},$$

which represents the average number of hydraulic radii through the thickness of the media in the flow direction. Exemplary design parameters and approximate maximum preferred values of $N_{hyd}$ for annular non-pleated coalescers while operating during non-contact of the seal are set forth below in tables 3 through 6.

TABLE 3

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Relatively High Speed Media Elements with Height to OD Aspect Ratio ~= 1 | | | | | | | | 1 | 3 | 10 | 25 |
| 3 | 45 | 75 | 11000 | 73 | 67 | 67 | 30 | 615 | 1048 | 1798 | 2285 |
| 4 | 60 | 100 | 11000 | 73 | 67 | 67 | 30 | 533 | 908 | 1557 | 1979 |
| 5 | 75 | 125 | 10000 | 83 | 77 | 77 | 35 | 563 | 963 | 1666 | 2232 |
| 6.7 | 101 | 168 | 10000 | 83 | 77 | 77 | 35 | 487 | 831 | 1439 | 1928 |
| 8.9 | 134 | 223 | 10000 | 83 | 77 | 77 | 35 | 422 | 721 | 1249 | 1673 |
| 11 | 165 | 275 | 10000 | 95 | 89 | 89 | 45 | 488 | 836 | 1460 | 2027 |
| 13 | 195 | 325 | 10000 | 95 | 89 | 89 | 45 | 449 | 769 | 1343 | 1864 |
| 15 | 225 | 375 | 9000 | 115 | 107 | 107 | 52 | 555 | 953 | 1677 | 2403 |
| 19 | 285 | 475 | 8500 | 125 | 117 | 117 | 52 | 565 | 970 | 1713 | 2484 |
| 30 | 450 | 750 | 7500 | 135 | 127 | 159 | 60 | 512 | 880 | 1560 | 2282 |

TABLE 4

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Moderate Speed Elements with Aspect Ratios <1 | | | | | | | | 1 | 3 | 10 | 25 |
| 3 | 45 | 75 | 6000 | 100 | 94 | 45 | 30 | 466 | 798 | 1397 | 1961 |
| 4 | 60 | 100 | 6000 | 100 | 94 | 45 | 30 | 404 | 691 | 1210 | 1698 |
| 5 | 75 | 125 | 6000 | 113 | 107 | 51 | 35 | 465 | 798 | 1405 | 2013 |
| 6.7 | 101 | 168 | 6000 | 113 | 107 | 51 | 35 | 402 | 689 | 1214 | 1739 |
| 8.9 | 134 | 223 | 6000 | 113 | 107 | 51 | 35 | 349 | 598 | 1053 | 1509 |
| 11 | 165 | 275 | 5000 | 131 | 123 | 59 | 45 | 343 | 990 | 1044 | 1521 |
| 13 | 195 | 325 | 5000 | 131 | 123 | 59 | 45 | 316 | 543 | 960 | 1400 |
| 15 | 225 | 375 | 5000 | 154 | 146 | 71 | 52 | 416 | 716 | 1274 | 1888 |
| 19 | 285 | 475 | 5000 | 167 | 159 | 78 | 52 | 442 | 761 | 1357 | 2024 |
| 30 | 450 | 750 | 4200 | 180 | 172 | 106 | 60 | 383 | 659 | 1178 | 1767 |

TABLE 5

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Lower Speed, Larger Media Elements with Aspect Ratios = 1 | | | | | | | | 1 | 3 | 10 | 25 |
| 3 | 45 | 75 | 4500 | 87 | 81 | 81 | 30 | 369 | 631 | 1095 | 1485 |
| 4 | 60 | 100 | 4500 | 87 | 81 | 81 | 30 | 319 | 546 | 948 | 1286 |
| 5 | 75 | 125 | 4500 | 98 | 92 | 92 | 35 | 369 | 632 | 1104 | 1544 |
| 6.7 | 101 | 168 | 4500 | 98 | 92 | 92 | 35 | 319 | 546 | 954 | 1333 |
| 8.9 | 134 | 223 | 4500 | 98 | 92 | 92 | 35 | 276 | 473 | 828 | 1157 |
| 11 | 165 | 275 | 4500 | 112 | 106 | 106 | 45 | 320 | 549 | 965 | 1381 |
| 13 | 195 | 325 | 4500 | 112 | 106 | 106 | 45 | 294 | 505 | 888 | 1271 |
| 15 | 225 | 375 | 4500 | 135 | 127 | 127 | 52 | 397 | 683 | 1209 | 1768 |
| 19 | 285 | 475 | 4000 | 146 | 138 | 138 | 52 | 377 | 647 | 1150 | 1696 |
| 30 | 450 | 750 | 3500 | 158 | 150 | 150 | 60 | 303 | 522 | 929 | 1379 |

TABLE 6

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Higher Speed, Compact Size Media Elements with Aspect Ratios = 1 | | | | | | | | 1 | 3 | 10 | 25 |
| 3 | 45 | 75 | 12000 | 60 | 54 | 54 | 30 | 413 | 701 | 1178 | 1220 |
| 4 | 60 | 100 | 12000 | 60 | 54 | 54 | 30 | 357 | 607 | 1020 | 1056 |
| 5 | 75 | 125 | 12000 | 68 | 62 | 62 | 35 | 421 | 717 | 1221 | 1487 |
| 6.7 | 101 | 168 | 12000 | 68 | 62 | 62 | 35 | 364 | 619 | 1055 | 1285 |
| 8.9 | 134 | 223 | 11000 | 68 | 62 | 62 | 35 | 289 | 492 | 839 | 1022 |
| 11 | 165 | 275 | 11000 | 78 | 72 | 72 | 45 | 333 | 568 | 979 | 1284 |
| 13 | 195 | 325 | 10000 | 78 | 72 | 72 | 45 | 278 | 475 | 819 | 1074 |
| 15 | 225 | 375 | 10000 | 94 | 88 | 88 | 52 | 382 | 654 | 1140 | 1577 |
| 19 | 285 | 475 | 9000 | 102 | 96 | 96 | 52 | 379 | 649 | 1136 | 1601 |
| 30 | 450 | 750 | 8000 | 113 | 105 | 105 | 60 | 316 | 542 | 954 | 1362 |

Exemplary design parameters and approximate maximum preferred values of $N_{hyd}$ for annular pleated coalescers operating during non-contact of the seal are set forth below in tables 7 through 10.

TABLE 7

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| Relatively High Speed Media Elements with Height to OD Aspect Ratio ~= 1 | | | | | | | | # Plts | 0.5 | # Plts | 1 | # Plts | 2 | # Plts | 4 |
| 3 | 75 | 11000 | 73 | 67 | 47 | 67 | 30 | 22 | 659 | 21 | 792 | 15 | 1120 | 9 | 1363 |
| 4 | 100 | 11000 | 73 | 67 | 47 | 67 | 30 | 22 | 571 | 21 | 686 | 15 | 970 | 9 | 1180 |
| 5 | 125 | 10000 | 83 | 77 | 57 | 77 | 35 | 27 | 619 | 26 | 742 | 18 | 1049 | 11 | 1273 |
| 6.7 | 168 | 10000 | 83 | 77 | 57 | 77 | 35 | 27 | 534 | 26 | 641 | 18 | 906 | 11 | 1100 |
| 8.9 | 223 | 10000 | 83 | 77 | 57 | 77 | 35 | 27 | 464 | 26 | 556 | 18 | 786 | 11 | 955 |
| 11 | 275 | 10000 | 95 | 89 | 59 | 89 | 45 | 28 | 611 | 26 | 720 | 19 | 1018 | 12 | 1197 |
| 13 | 325 | 10000 | 95 | 89 | 59 | 89 | 45 | 28 | 562 | 26 | 662 | 19 | 936 | 12 | 1101 |
| 15 | 375 | 9000 | 115 | 107 | 77 | 107 | 52 | 36 | 722 | 35 | 850 | 24 | 1202 | 15 | 1408 |
| 19 | 475 | 8500 | 125 | 117 | 87 | 117 | 52 | 41 | 746 | 39 | 877 | 27 | 1241 | 17 | 1452 |
| 30 | 750 | 7500 | 135 | 127 | 97 | 159 | 60 | 46 | 685 | 44 | 805 | 30 | 1139 | 19 | 1332 |

TABLE 8

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| Moderate Speed Elements with Aspect Ratios <1 | | | | | | | | # Plts | 0.5 | # Plts | 1 | # Plts | 2 | # Plts | 4 |
| 3 | 75 | 6000 | 100 | 94 | 74 | 45 | 30 | 35 | 526 | 33 | 630 | 23 | 890 | 15 | 1078 |
| 4 | 100 | 6000 | 100 | 94 | 74 | 45 | 30 | 35 | 456 | 33 | 545 | 23 | 771 | 15 | 933 |
| 5 | 125 | 6000 | 113 | 107 | 77 | 51 | 35 | 36 | 605 | 35 | 712 | 24 | 1007 | 15 | 1180 |
| 6.7 | 168 | 6000 | 113 | 107 | 77 | 51 | 35 | 36 | 522 | 35 | 615 | 24 | 870 | 15 | 1019 |
| 8.9 | 223 | 6000 | 113 | 107 | 77 | 51 | 35 | 36 | 453 | 35 | 534 | 24 | 755 | 15 | 884 |
| 11 | 275 | 5000 | 131 | 123 | 93 | 59 | 45 | 44 | 457 | 42 | 537 | 29 | 760 | 18 | 889 |
| 13 | 325 | 5000 | 131 | 123 | 93 | 59 | 45 | 44 | 420 | 42 | 494 | 29 | 699 | 18 | 818 |
| 15 | 375 | 5000 | 154 | 146 | 116 | 71 | 52 | 55 | 567 | 52 | 666 | 36 | 942 | 23 | 1101 |
| 19 | 475 | 5000 | 167 | 159 | 129 | 78 | 52 | 61 | 608 | 58 | 714 | 41 | 1010 | 25 | 1179 |
| 30 | 750 | 4200 | 180 | 172 | 142 | 106 | 60 | 67 | 531 | 64 | 624 | 45 | 882 | 28 | 1029 |

TABLE 9

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| | | | | | | | | # Plts | 0.5 | # Plts | 1 | # Plts | 2 | # Plts | 4 |
| Lower Speed, Larger Media Elements with Aspect Ratios = 1 | | | | | | | | | | | | | | | |
| 3 | 75 | 4500 | 87 | 81 | 61 | 81 | 30 | 29 | 408 | 27 | 489 | 19 | 691 | 12 | 839 |
| 4 | 100 | 4500 | 87 | 81 | 61 | 81 | 30 | 29 | 353 | 27 | 423 | 19 | 599 | 12 | 726 |
| 5 | 125 | 4500 | 98 | 92 | 72 | 92 | 35 | 34 | 415 | 32 | 497 | 23 | 703 | 14 | 851 |
| 6.7 | 168 | 4500 | 98 | 92 | 62 | 92 | 35 | 29 | 401 | 28 | 473 | 19 | 669 | 12 | 786 |
| 8.9 | 223 | 4500 | 98 | 92 | 62 | 92 | 35 | 29 | 348 | 28 | 410 | 19 | 580 | 12 | 682 |
| 11 | 275 | 4500 | 112 | 106 | 76 | 106 | 45 | 36 | 415 | 34 | 488 | 24 | 691 | 15 | 810 |
| 13 | 325 | 4500 | 112 | 106 | 76 | 106 | 45 | 36 | 382 | 34 | 449 | 24 | 635 | 15 | 745 |
| 15 | 375 | 4500 | 135 | 127 | 97 | 127 | 52 | 45 | 531 | 43 | 624 | 30 | 883 | 19 | 1032 |
| 19 | 475 | 4000 | 146 | 138 | 108 | 138 | 52 | 51 | 509 | 48 | 599 | 34 | 847 | 21 | 989 |
| 30 | 750 | 3500 | 158 | 150 | 120 | 150 | 60 | 56 | 414 | 54 | 487 | 38 | 688 | 23 | 804 |

TABLE 10

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| | | | | | | | | # Plts | 0.5 | # Plts | 1 | # Plts | 2 | # Plts | 4 |
| High Speed, Compact Size Media Elements with Aspect Ratios = 1 | | | | | | | | | | | | | | | |
| 3 | 75 | 12000 | 60 | 54 | 34 | 54 | 30 | 16 | 421 | 15 | 507 | 11 | 717 | 7 | 877 |
| 4 | 100 | 12000 | 60 | 54 | 34 | 54 | 30 | 16 | 364 | 15 | 439 | 11 | 621 | 7 | 759 |
| 5 | 125 | 12000 | 68 | 62 | 42 | 62 | 35 | 20 | 444 | 19 | 534 | 13 | 755 | 8 | 921 |
| 6.7 | 168 | 12000 | 68 | 62 | 42 | 62 | 35 | 20 | 384 | 19 | 461 | 13 | 652 | 8 | 796 |
| 8.9 | 223 | 11000 | 68 | 62 | 42 | 62 | 35 | 20 | 305 | 19 | 367 | 13 | 519 | 8 | 633 |
| 11 | 275 | 11000 | 78 | 72 | 52 | 72 | 45 | 25 | 362 | 23 | 434 | 16 | 613 | 10 | 746 |
| 13 | 325 | 10000 | 78 | 72 | 52 | 72 | 45 | 25 | 302 | 23 | 363 | 16 | 513 | 10 | 624 |
| 15 | 375 | 10000 | 94 | 88 | 58 | 88 | 52 | 27 | 475 | 26 | 561 | 18 | 793 | 11 | 932 |
| 19 | 475 | 9000 | 102 | 96 | 66 | 96 | 52 | 31 | 481 | 30 | 567 | 21 | 802 | 13 | 942 |
| 30 | 750 | 8000 | 113 | 105 | 75 | 105 | 60 | 35 | 409 | 33 | 482 | 23 | 681 | 15 | 799 |

As shown above in Tables 3-10, particular embodiments of rotating coalescers for diesel engine crankcase ventilation applications generally indicate that values of $N_{hyd}$ less than approximately 3000 are required to avoid bypassing unfiltered flow though the clearance existing when the seal is not in contact (i.e., the seal is not preventing negative recirculation), with several cases requiring lesser values than 3000. These embodiments, listed for engine displacements ranging from 3-30 liters and blowby flowrates of 75-750, respectively, are applicable across a wide range of commercial gasoline, diesel, natural gas, or other alternatively fueled engine applications. In situations in which the seal remains in contact during operation, the number of hydraulic radii set forth in tables 3 through 10 is greater than the values listed in tables 3 through 10.

Preferred values of $N_{hyd}$ tend to depend on the thickness of the employed media. In many arrangements of annular non-pleated media during non-contact of the seal situations, preferential maximum values for $N_{hyd}$ include: 500 for media with 0-0.5 mm thickness, 700 for 0.5-1 mm thick media, 1000 for 1-2 mm thick media, 1300 for 2-4 mm thick media, 1800 for 4-8 mm thick media, 2300 for 8-15 mm thick media, 3000 for 15-30 mm thick media, and 4000 for >30 mm thick media. In many arrangements of annular pleated media, preferential maximum values for $N_{hyd}$ during operation with a non-contacting seal include: 800 for media with 0-0.5 mm thickness, 950 for 0.5-1 mm thick media, 1400 for 1-2 mm thick media, 1700 for 2-4 mm thick media, and 2000 for 4-8 mm thick media, and somewhat larger values for media thicker than 8 mm. Nevertheless, it is possible that certain applications with very different amount of physical installation space available and other competing design objectives would maintain the efficiency benefits from positive recirculation at higher or lower values than those taught above, thus it can be beneficial to simply maintain adherence to criteria for maximum number of hydraulic radii for annular non-pleated porous filter elements and pleated porous filter elements, respectively, such that recirculation flow is maintained.

Equation 7 defines the criteria for maximum number of hydraulic radii for annular non-pleated porous filter elements, and equation 8 defines the criteria for maximum number of hydraulic radii for annular pleated porous filter elements, above which unfiltered gas would be expected to bypass in the case of non-contacting seals.

$$N_{hyd(annular)} < \sqrt{\frac{\pi \cdot h \cdot (D_2 - D_1)^2 \cdot \omega^2 \cdot (D_3^2 - D_0^2)}{16 \cdot Q \cdot v \cdot \ln\left(\frac{D_2}{D_1}\right)}} \quad (7)$$

$$N_{hyd(pleated)} < \sqrt{\frac{N \cdot h \cdot \left(D_2^2 - 2 D_1 D_2 \cos\left(\frac{\pi}{N}\right) + D_1^2\right)^{\frac{1}{2}} \cdot t \cdot \omega^2 \cdot (D_3^2 - D_0^2)}{8 \cdot Q \cdot v}} \quad (8)$$

Furthermore, fibrous coalescing filtering efficiency is typically higher for elements with media having greater total hydraulic radii count in the flow direction, due to smallness of pore or fiber, or number of opportunities for aerosol droplets and particulate matter to become captured within the medium as flow proceeds through the media from upstream to downstream. Thus, optimum designs for overall aerosol filtering efficiency can be found in the vicinity of the aforementioned maximum hydraulic radii count values. However, allowance for variation in application conditions (e.g., engine wear resulting in blow-by flow rate increases, solid or semi-solid contaminants becoming captured by the filtering medium that further restricts flow through the media, etc.) suggest that optimum values of hydraulic radii count may be less than the maximum values listed above for non-contacting seals. While designs with filter media having significantly lower hydraulic radii count values, such as 10, will almost certainly result in positive recirculation, their overall aerosol filtering efficiencies are not as high as those optimized according to the above-described methodologies. Thus, for certain products that are designed primarily for the objective of highest efficiency, a range of suitable values for the $N_{hyd}$ can be defined. In many arrangements, preferential ranges of the parameter for annular non-pleated media elements include: 75-500 for 0-0.5 mm thick media, 100-700 for 0.5-1 mm thick media, 130-1000 for 1-2 mm thick media, 160-1300 for 2-4 mm thick media, 200-1800 for 4-8 mm thick media, 300-2200 for 8-15 mm thick media, 400-3000 for 15-30 mm thick media, and 600-4000 for >30 mm thick media. For annular pleated media elements, preferential ranges of values for $N_{hyd}$ include: 120-800 for media with 0-0.5 mm thickness, 140-950 for 0.5-1 mm thick media, 180-1400 for 1-2 mm thick media, 240-1700 for 2-4 mm thick media, and 300-2000 for 4-8 mm thick media, and somewhat larger values for media thicker than 8 mm. These ranges establish values where there exists an optimum tradeoff between: (a) the inefficiency of porous media due to small aerosol size, excessive size of pores or fibers, or excessive porosity and (b) the inefficiency of the rotating coalescing filter system overall due to potential bypass of flow, unfiltered through the gap created by the non-contacting seal clearance.

The relationships set forth in equations 7 and 8 are derived by considering the positive pumping pressure versus the negative pressure drop (dP) across the filter element as set forth below in equations 9 through 13. In equations 9-13, R corresponds to the radius of the noted diameter as defined above.

$$P_{rise} = \rho \cdot \frac{\omega^2}{2} \cdot \left(\left(\frac{D_3}{2}\right)^2 - \left(\frac{D_0}{2}\right)^2\right) \quad (9)$$

$$\Delta P_{media} = \frac{\mu \cdot Q}{2 \cdot \pi \cdot h \cdot \kappa} \cdot \ln\left(\frac{D_2}{D_1}\right) \quad (10)$$

$$\frac{P_{rise}}{\Delta P_{media}} > 1 \quad (11)$$

$$\frac{\rho \cdot \frac{\omega^2}{8} \cdot (D_3^2 - D_0^2)}{\frac{\mu \cdot Q}{2 \cdot \pi \cdot h \cdot \kappa} \cdot \ln\left(\frac{D_2}{D_1}\right)} > 1, \quad (12)$$

and by definition:

$$\frac{\pi \cdot \kappa \cdot \omega^2 \cdot h \cdot (D_3^2 - D_0^2)}{4 \cdot Q \cdot v \cdot \ln\left(\frac{D_2}{D_1}\right)} > 1 \quad (13)$$

Accordingly, the objective for annular media rotating CV systems in which the seal is non-contacting (e.g., as described above) is to maintain the relationship set forth above in equation 13.

The above-described systems and methods are not limited to separating oil and aerosols from crankcase blowby gases. The same or similar arrangements and principles can be used in other filtration systems that utilize porous coalescer technology to separate liquid from a gas-liquid mixture.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments, and elements from different embodiments may be combined in a manner understood to one of ordinary skill in the art. Other substitutions, modifications, changes and omissions may also be made in the design, operating conditions and arrangement of the various exemplary embodiments without departing from the scope of the present invention.

What is claimed is:

1. A crankcase ventilation system comprising:
   a housing;
   an inlet configured to receive blowby gases from an internal combustion engine and to provide the blowby gases to the housing;
   an outlet configured to provide filtered blowby gases from the housing and to at least one of an intake of the internal combustion engine and an ambient;
   a rotating coalescer positioned within the housing, the rotating coalescer including:
      an endcap, and
      a filter media; and
   an oil inlet providing oil to a gap between a stationary portion of the housing and the endcap such that a hydrodynamic seal is formed by the oil positioned in the gap during an operating condition of the rotating coalescer, the hydrodynamic seal preventing a negative recirculation of the blowby gases;
   wherein when the rotating coalescer rotates above a threshold rotational velocity and creates a pumping pressure that causes a high pressure within the housing on a clean side of the filter media and a low pressure on a dirty side of the filter media, thereby causing a positive recirculation of the blowby gases in which a portion of already filtered blowby gas from the clean side of the filter media returns through the gap to the dirty side of the filter media, such that the hydrodynamic seal is broken.

2. The crankcase ventilation system of claim 1, wherein the oil inlet provides oil to a groove that defines the gap.

3. The crankcase ventilation system of claim 2, wherein the endcap includes a tongue that partially extends into the groove and further defines the gap.

4. The crankcase ventilation system of claim 3, wherein the tongue is structured to provide axial vibration damping of the rotating coalescer with respect to the housing.

5. The crankcase ventilation system of claim 1, wherein the hydrodynamic seal is formed in part by a radial oil groove around a circumference of the stationary portion of the housing.

6. The crankcase ventilation system of claim 1, wherein the filter media is non-pleated.

7. A crankcase ventilation system comprising:
   a housing;
   an inlet configured to receive blowby gases from an internal combustion engine and to provide the blowby gases to the housing;
   an outlet configured to provide filtered blowby gases from the housing and to at least one of an intake of the internal combustion engine and an ambient;
   a rotating coalescer positioned within the housing, the rotating coalescer including:
      an endcap, and
      a filter media; and
   an oil inlet providing oil to a gap between a stationary portion of the housing and the endcap such that a hydrodynamic seal is formed by the oil positioned in the gap during an operating condition of the rotating coalescer, the hydrodynamic seal preventing a negative recirculation of the blowby gases,
   wherein the filter media is selected such that $$\frac{\pi \cdot \kappa \cdot \omega^2 \cdot h \cdot (D_3^2 - D_0^2)}{4 \cdot Q \cdot v \cdot \ln\left(\frac{D_2}{D_1}\right)} < 1$$

is satisfied, where:
ρ is gas density of the blowby gases,
ω is the rotational speed of the rotating coalescer,
h is a media height of the filter media,
$D_0$ is an inside diameter of a rotating annul portion of the rotating coalescer, the rotating annul portion representing the outer diameter of the gap,
$D_1$ is an inner diameter of the filter media,
$D_2$ is an outer diameter of the filter media,
$D_3$ is an outer diameter of the rotating coalescer,
μ is a viscosity of the blowby gases,
ν is a kinematic viscosity of the blowby gases,
Q is a flowrate of the blowby gases, and
κ is a permeability of the filter media.

8. The crankcase ventilation system of claim 6, wherein the filter media comprises multiple layers of filter media.

9. The crankcase ventilation system of claim 1, wherein the filter media is pleated.

10. A crankcase ventilation system comprising:
    a housing;
    an inlet configured to receive blowby gases from an internal combustion engine and to provide the blowby gases to the housing;
    an outlet configured to provide filtered blowby gases from the housing and to at least one of an intake of the internal combustion engine and an ambient;
    a rotating coalescer positioned within the housing, the rotating coalescer including:
       an endcap, and
       a filter media; and
    an oil inlet providing oil to a gap between a stationary portion of the housing and the endcap such that a hydrodynamic seal is formed by the oil positioned in the gap during an operating condition of the rotating coalescer, the hydrodynamic seal preventing a negative recirculation of the blowby gases,
    wherein the filter media is selected such that $$\frac{\kappa \cdot N \cdot h \cdot \left(D_2^2 - 2D_1 D_2 \cos\left(\frac{\pi}{N}\right) + D_1^2\right)^{\frac{1}{2}} \cdot \omega^2 \cdot (D_3^2 - D_0^2)}{8 \cdot Q \cdot v \cdot t} < 1$$

is satisfied, where:
ρ is gas density of the blowby gases,
ω is the rotational speed of the rotating coalescer,
h is a media height of the filter media,
t is a thickness of the filter media that is normal to a flow direction through the filter media,
N is a number of pleats of the filter media,
$D_0$ is an inside diameter of a rotating annul portion of the rotating coalescer, the rotating annul portion representing the outer diameter of the gap,
$D_1$ is an inner diameter of the filter media,
$D_2$ is an outer diameter of the filter media,
$D_3$ is an outer diameter of the rotating coalescer,
μ is a viscosity of the blowby gases,
ν is a kinematic viscosity of the blowby gases,
Q is a flowrate of the blowby gases, and
κ is a permeability of the filter media.

11. The crankcase ventilation system of claim 1, wherein the stationary portion is a drain pan of the housing.

12. A crankcase ventilation system comprising:
a housing;
an inlet configured to receive blowby gases from an internal combustion engine and to provide the blowby gases to the housing;
an outlet configured to provide filtered blowby gases from the housing and to at least one of an intake of the internal combustion engine and an ambient;
a rotating coalescer positioned within the housing such that a gap exists between a portion of the rotating coalescer and a stationary portion of the housing; and
an elastomeric gasket that provides a seal between the rotating coalescer and the stationary portion of the housing:,
wherein when the rotating coalescer rotates above a threshold rotational velocity and creates a pumping pressure that causes a high pressure within the housing on a clean side of the filter media and a low pressure on a dirty side of the filter media, a positive recirculation of the blowby gases collapses a portion of the elastomeric gasket to provide passage of a portion of already filtered blowby gas from the clean side of the filter media through the gap to the dirty side of the filter media, such that the seal is broken.

13. The crankcase ventilation system of claim 12, wherein the rotating coalescer includes:
an endcap, and
a filter media.

14. The crankcase ventilation system of claim 12, wherein the elastomeric gasket is V-shaped.

15. The crankcase ventilation system of claim 12, wherein the elastomeric gasket is U-shaped.

16. The crankcase ventilation system of claim 12, wherein the elastomeric gasket is a lip seal.

17. The crankcase ventilation system of claim 12, wherein the elastomeric gasket includes a metallic stiffening component.

18. The crankcase ventilation system of claim 17, wherein the metallic stiffening component comprises a spring that increases a sealing force of the elastomeric gasket.

* * * * *